Dec. 10, 1935. C. OPOLO 2,023,789
CUSHION AXLE
Filed Feb. 6, 1935 2 Sheets-Sheet 1
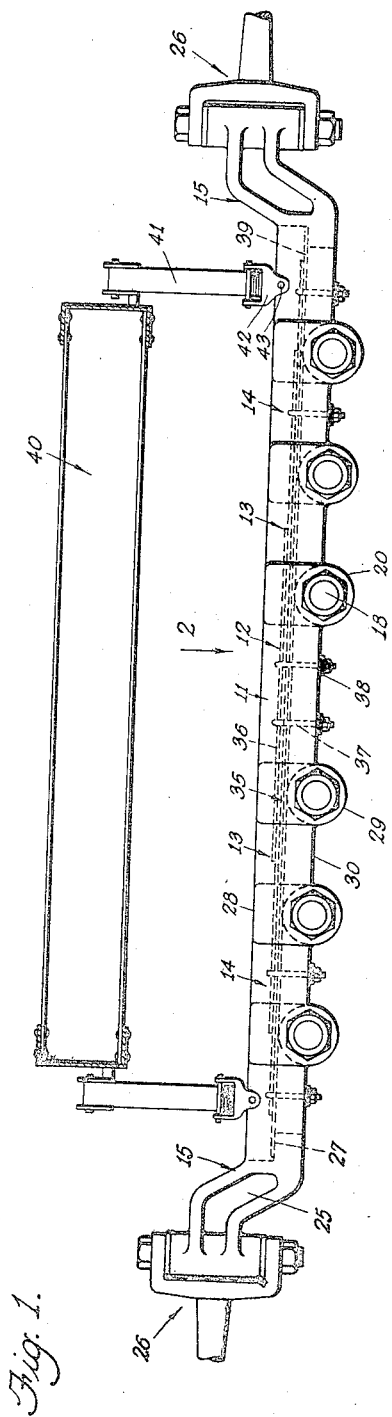
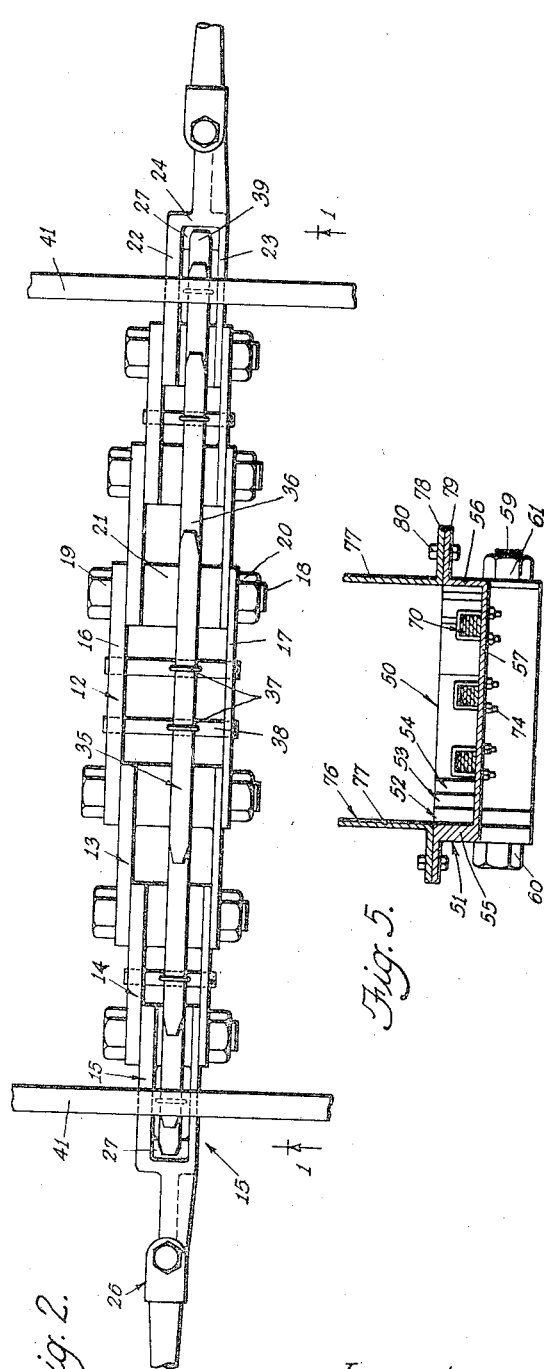
Inventor
C. Opolo
by Hazard and Miller
Attorneys.

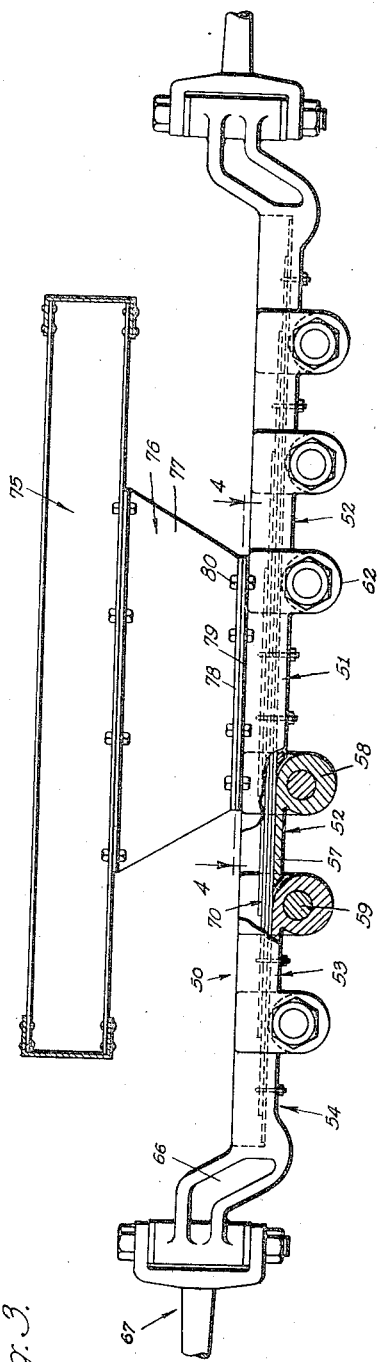

Patented Dec. 10, 1935

2,023,789

UNITED STATES PATENT OFFICE 2,023,789

CUSHION AXLE

Charles Opolo, Culver City, Calif.

Application February 6, 1935, Serial No. 5,229

16 Claims. (Cl. 267—19)

My invention relates to a flexible axle to give a cushioning effect between the vehicle and the road resulting from road shocks and is applicable to an axle having steering wheels or axles of a trailer.

An object and feature of my invention is forming the axle with a plurality of links pivoted or hinged together with the wheels mounted on the ends of the two outside links. In order to stiffen such an axle and provide resiliency, a leaf spring or a series of leaf springs are utilized extending along the axle. These leaf springs thus engage the various links of the axle retaining them more or less in alignment or with a desired degree of curvature for the axle as a whole when considered in elevation. Thus by this construction of axle having a plurality of links with the springs for stiffening the axle and giving resiliency, either of the wheels may respond individually to bumps or depressions along one side of the road or the links and springs may flex due to the simultaneous reaction of both of the wheels on each side of the vehicle due to road shocks. The springs cause the axle to react when the wheels are pressed upwardly upon striking a bump or drop downwardly in a depression on the road. Thus by the combination of the link type of axle with the springs the direct transference of road shocks to the vehicle frame is prevented.

In one form of my invention I secure the center link of the assembly to a central bracket depending from the vehicle frame and have a plurality of independent links extending outwardly in opposite directions from the central link. An assembly of leaf springs or if desired one leaf spring extends along the axle overlapping the various links.

Another object and feature of separate assemblies of springs is that these may be made of different lengths, the longest assembly extending between the two outside links, the next shortest assembly extends over the full assembly of links except the two outside and further assembly of springs are reduced in length to cover successively lesser number of links. This construction increases the stiffness of the axle towards the center but makes it quite flexible at the outside links to which the wheels are connected.

In another form of my invention the central link is detached or free of the vehicle frame and a plurality of individual links connecting one to the other extend outwardly from this central link, the wheels being attached to the outside part of the assembly. In this case the assembly of the leaf springs has at least one set which extends the full length of all of the links of the axle. The connection to the vehicle frame is by using a spring connection between the outside links and the frame of the vehicle on each side of such frame and this is preferably done by using longitudinally extending leaf springs, such latter springs give a stiffness to the axle and eliminate the necessity of using radius rods.

Another feature of my invention is constructing the assembly of links for the flexible axle in such a manner that the central links have the longest pintles and these pintles successively decrease in length towards the outer links of the axle assembly. Thus with this type a plurality of leaf spring assembly may be readily used and on account of the different lengths of the pintles a longitudinal stiffness of the axle is developed so that the radius rods are not necessary.

Another characteristic of my axle is forming each of the links in the manner of a channel with a horizontal web and vertical flanges on each side. Thus when these links are assembled to form a continuous channel between the two outside links they form a housing to accommodate the leaf springs. These leaf springs thus bear on the web of the channels of the various links. This contact between the springs and the webs develops a friction action when the axle links flex and permits the construction of a relatively stiff axle with a lesser number of leaves in the springs than if the axle did not have the contact between the web and the leaves of the spring. This arrangement also allows a packing of grease or oil in the channel.

My invention is illustrated in connection with the accompanying drawings, in which, Fig. 1 is a vertical section taken on the line 1—1 of Fig. 2 in the direction of the arrows, showing the type of axle with a spring connection to the vehicle at opposite sides.

Fig. 2 is a plan in the direction of the arrow 2 of Fig. 1, the vehicle frame being omitted and the longitudinal springs broken away.

Fig. 3 is an elevation taken in the direction of the arrow 3 of Fig. 4 partly broken away, of a modified construction having a central support for the axle.

Fig. 4 is a horizontal section on the line 4—4 of Fig. 3, taken in the direction of the arrows and omitting the bracket connected to the vehicle frame;

Fig. 5 is a longitudinal section on the line 5—5 of Fig. 4 in the direction of the arrows.

Dealing first with the construction of Figs. 1 and 2, the axle 11 is made up of a series of links, there being a center link 12, a similar pair of adjacent links 13, a further outside set of links 14 and an outside axle link section 15. The links 12, 13 and 14 are made by employing side plates 16 and 17 of which the plates 16 are thicker than the plate 17, preferably to add additional strength to the rear side of the axle. The various links are connected by pintle or hinge pins 18, each having a head 19 and a nut 20, there being employed knuckle or spacer sleeves 21 on the bolts between the inside faces of the plates of the various links. These spacers may be formed integral with a smaller link end connected by any one pintle pin or they may be short tubes or pipes fitted on the bolt of the proper length to space the plates 16 and 17 of each of the links. It will be noted by this construction viewed in plan that the links successively become narrower in a longitudinal direction of the vehicle considered from the center to the outside link.

The outside axle section or link 15 is formed with side plates 22 and 23, thus forming a yoke merging with the end 24 and the bent up axle section 25 which carries the swivel end 26 of a steering axle or if used for an axle with non-steering wheels may have a rigid wheel axle. The yoke formed by the plates 22 and 23 and the end 24 has a spring seat 27, this being horizontal and the plates 22 and 23 above this seat with the seat form a short channel for the outer link.

This seat is preferably on the same level or line as the upper surface of the spacers or knuckles 21 of the hinge pintles. In order that this upper surface of these knuckles may be below the upper edge 28 of the link plates, these link plates have a downward projecting portion 29 near the bottom which accommodates the pintle pins with the axes of the pins substantially in alignment with the lower edge 30 of the link plates.

With this link construction of axle I employ a leaf spring assembly designated generally by the assembly numeral 35. This employs a spring made of a plurality of leaves of different lengths designated 36 and at the center these are clamped by a U type of clamp bolt 37 having a bearing on longitudinal bars 38 which extend between the two outside link plates of the links where it is desired to clamp the spring. The spring is shown as clamped at the center link 12 and at both of the outside links 14. There is also a clamp at the outside link section 15. All of these clamps are of the same type and change in size in accordance with the decreasing vertical height of the leaf spring. The opposite outer ends 39 of the leaf spring have a bearing on the spring seats 27 of the outside link sections 15 and the lower leaf of the spring assembly at its intermediate portions rests on the knuckle sleeves 21 of each pintle.

The axle is connected to the vehicle frame designated generally by the assembly number 40, by longitudinally extending leaf springs 41 which may be secured in the usual manner to the sides of the vehicle frame and are housed in the spring seat 42 which is connected to the outer axle section 15 by a longitudinal pivot pin 43. This allows the axle sections to each turn on its own pivot and the outer axle sections 15 to swivel on the pivot 43 of the side springs 41. These side springs should be attached rigidly at least at one end to the vehicle frame and if a swivel is used at the opposite end this swivel construction should be such as to prevent twisting or a rotating side movement of the springs 41.

The manner of operating and functioning of the axle above described is as follows: The axle itself formed of the leaf springs is very flexible and the individual links may flex up or down in relation to the next adjacent link. It is therefore necessary to use a leaf spring of sufficient stiffness to normally hold the axle link sections in proper alignment. These are shown to be in horizontal alignment but they might have a curvature if so desired. The sole connection between the axle and the vehicle is by the two side leaf springs 41 which give a longitudinal stiffness to the axle and may thus eliminate the use of radius rods connected to the axle.

When a vehicle having this type of axle is traveling over a road, if bumps of equal size or depressions of equal size are met by both of the wheels at the same time, the side springs 41 will flex and the spring function much the same as a rigid axle having a side spring connection to the vehicle frame. However, there will be a slight reaction of the individual links causing the spring assembly to flex upwardly at the ends. On account of this transverse leaf spring being stronger at the center than at the outer ends, there is a greater degree of flexibility to the axle at such outer ends. Presuming however, that one wheel on one side only of the vehicle strikes a bump or drops into a depression in the road, then the one side of the axle will either flex up or down relative to the other side, the resistance to this movement being taken care of by one of the longitudinal springs 41 and by the transverse spring 35, the side having the upward or downward moving wheel flexing to a greater extent than the other side.

In the construction of Figs. 3, 4 and 5, the axle designated by the assembly number 50 is made up of a series of links in which there is a center link 51, two links 52, each attached to an end of the link, an intermediate pair of links 53 attached to the outer end of the links 52 and an outer link or end axle section 54 attached to the outer ends of the links 53. Each of these links has vertical flanges 55 and 56, the rearward flange 55 being thicker and thus stronger. The flanges of each link are connected by a flat web 57 which is designed to occupy a substantially horizontal position. Also formed integral with the web of each link except the central link 51, there is a knuckle sleeve 58 through which extends the pintle bolt 59. Each pintle bolt has a head 60 and a nut 61. It is to be noted that the pintles extend through the knuckle sleeves eccentric thereto in order to provide sufficient strength below the pintle pins. The depending portion 62 of each flange is for the purpose of covering the ends of the knuckle sleeve portion of the adjacent link and also provide a bearing for the heads 60 and the nuts 61 of the pintle bolts. It will be noted that the axial center of these pintle bolts is below the webs 57.

The outside link 54 or end axle section has the flanges 63 and 64 connected by an end piece 65, thus forming in effect a yoke from the end of which yoke there is an upwardly extending end section 66 to which is connected the steering wheel axle assembly 67 which is of the usual type.

With this type of axle the pintles for the center links are preferably longer than for the outer links which thus successively become narrower from the center to the ends of the axle. To form this construction it is preferable to have certain of the vertical flanges with a bend as indicated at 68.

The spring assemblies designated generally by the numeral 70 employ a first or a longitudinal set of springs 71, an intermediate set 72 and a short set 73. These are all leaf springs. Each assembly of springs seats on the flat webs of the links, which links in longitudinal section form channels and thus the bottom leaf of each spring assembly may be considered as resting on the bottom of a channel formed by the successive links which are channel-shaped in longitudinal section. Each of the springs is clamped in place by a U type of clamp bolt designated 74. In order to give the desired flexibility it appears preferable to clamp all of the springs to the center link and the longest spring assembly 71 only to the outer two links. The intermediate and shorter springs 72 and 73 may have the outer clamps omitted.

With this type of spring assembly the flat web of each link is contacted by the under leaf of each of the spring assemblies, whereby if the links flex downwardly the springs follow up this movement, maintaining a contact with the webs. Also if the links flex upwardly, the springs exert a downward pressure. Thus the springs react both to the upward and downward movement of the axle ends having the wheels and thus form a resilient or cushioning axle.

The type of axle of Figs. 3 and 4 is shown attached to the vehicle frame 75 by a central depending bracket 76. This bracket is formed of two transverse plates 77 having a horizontal flange 78 at the bottom which contacts a horizontal flange 79 on the side flanges 55 and 56 of the central link 51 only. These flanges 78 and 79 are secured together by bolts 80 (note Fig. 5). By this construction the center link 51 is firmly attached to the center portion of the vehicle frame and the outside link sections of the axle may freely work up and down with a pivotal movement from the ends of this center link. By this construction the wheels on the axle ends may react relatively to the vehicle frame by both simultaneously moving upward or downward in accordance with whether the wheels strike a bump or depression in the road or either wheel or axle and may operate independently of the other axle portion. With this construction of the axle extended in a longitudinal direction at the center portion and in effect tapering towards its ends, the radius rods may be omitted.

Various changes may be made in the details of construction without departing from the spirit or scope of the invention as defined by the appended claims.

I claim:

1. An axle construction having a central link, a plurality of lateral outside links, each of the links being connected to the adjacent link by a longitudinal pintle, the outermost link having means for mounting wheels, the center link having the greatest measurement in a longitudinal direction and the successively outer links decreasing in longitudinal measurements, a leaf spring extending transversely along the links and having its outer ends bearing on the outermost links, means to transmit a pressure between the leaf spring and all of the pintles whereby the links may be retained in operative alignment, certain of said links having means for attachment to a vehicle frame.

2. In an axle construction, a center link, a plurality of outside links, each link being connected to the adjacent link by a longitudinal pintle, the outermost link having means for mounting wheels, a leaf spring extending transversely along the links, means to rigidly secure the spring to the center link, there being a bearing on the outermost link for the ends of the spring, and means to secure at least one of the links to a vehicle frame, a pressure transmitting means reacting between the center link and the outermost links to transmit a spring pressure to the intermediate links.

3. An axle having a central link, two outermost links at each side thereof having means for mounting wheels, intermediate links between the central and the outermost links, each link being connected to an adjacent link by a longitudinal pintle, a leaf spring securely attached to the central link and passing over all of the pintles, there being a bearing on the outermost links for the opposite ends of the spring, and means to attach one or more of the links to a vehicle frame, one or more additional leaf springs securely attached to the central link and extending over a lesser number of links than the first mentioned spring, the additional spring or springs being spaced in a longitudinal direction from the first mentioned spring.

4. An axle having a central link, two outermost links on each side thereof and each having means for mounting wheels, a plurality of intermediate links between the central and each of the outermost links, each link being connected to the adjacent link by a longitudinal pintle, the pintles through the central link being longer than the pintles through the intermediate or outermost links, the links thereby decreasing in longitudinal measurement from the central to the outermost links, a leaf spring securely attached to the central link, extending transversely over all the links and having an end bearing on each of the outermost links.

5. An axle as claimed in claim 4, a second leaf spring securely attached to the central spring and extending laterally over the pintles less in number than the pintles connecting all of the links, said second spring being spaced in a longitudinal direction from the first mentioned spring.

6. An axle having a central link, a pair of outermost links, each having means for attaching wheels, intermediate links between the central and the outermost links, each link being connected to the adjacent link by a longitudinal pintle, certain of said links being channel-shaped in longitudinal section having a longitudinal web and vertical side plates, a leaf spring secured to the central link and extending laterally over all of the links and having an end bearing on each of the outermost links, and means to attach one or more links to a vehicle frame.

7. An axle as claimed in claim 6, the leaf spring having a plurality of leaves, the lower leaf bearing on the webs of the channels of the links.

8. An axle as claimed in claim 6, certain of the links having sleeve-like knuckles through which the pintles pass, the said knuckles connecting the side plates of the links.

9. An axle as claimed in claim 6, certain of the links channel-shaped in a longitudinal section having a flat horizontal web connecting two vertical side plates with each web terminating at one end in a sleeve-like knuckle surrounding a pintle.

10. An axle construction having a central link and two outermost links, each having means for mounting a wheel, intermediate links between the central and the outermost links, each of the links having two vertical side plates spaced apart by a sleeve-like knuckle, a longitudinal pintle through each knuckle, thereby connecting the various links, a leaf spring rigidly connected to the central link and extending over all of the knuckles, a bearing on each outermost link for an end of the leaf spring, and means to attach one or more links to a vehicle frame.

11. An axle construction as claimed in claim 10, certain of the links being channel-shaped in longitudinal section but having a web connecting the vertical side plates, the lowermost leaf of the leaf spring contacting the said webs.

12. In an axle, the combination of a vehicle frame, a bracket depending therefrom, a center link rigidly attached to the bracket, a plurality of outer links extending outwardly from each end of the center link, the outermost link at each side having means for mounting a wheel, each link being connected to the adjacent link by a longitudinal pintle, a leaf spring tightly attached to the center link and extending laterally over the pintles of all of the links and there being a bearing on each of the outermost links for the outer end of the spring.

13. In an axle, the combination of a vehicle frame having a bracket depending therefrom, a plurality of axle links extending outwardly laterally from the bracket on opposite sides thereof, means pivotally connecting two opposite links to the bracket by longitudinal pivots, the outermost links on opposite sides having means for mounting wheels, each link being connected to the adjacent link by a longitudinal pivot, a transverse leaf spring, means attaching the center portion of the leaf spring in rigid relation to the bracket, the said spring extending over the pintles of all of the links, each outermost link on opposite sides of the bracket having a bearing for the outer end of the leaf spring.

14. In an axle as claimed in claim 13, the links immediately connected to the bracket being wider in a longitudinal direction than the links further outwardly of the axle and a second leaf spring having means to firmly connect the second spring to the bracket and the second spring extending over a lesser number of links than the first mentioned spring.

15. In an axle, the combination of a vehicle frame, an axle structure having a center link and a plurality of links extending outwardly from each end of the center link transversely of the vehicle frame, the two outermost links each having means for mounting a wheel, a spring connection between each outermost link and the vehicle frame, each of the links being connected to the adjacent link by a longitudinal pintle, a leaf spring rigidly connected to the center link and extending transversely over all of the links, there being a bearing on the two outermost links for the opposite ends of the spring.

16. In an axle as claimed in claim 15, the center link being widest in a longitudinal direction than all of the other links, the outer links successively decreasing in width considered in a longitudinal direction and the pintles through the outer links successively decreasing in length.

CHARLES OPOLO.